United States Patent [19]
Pence

[11] Patent Number: 5,210,974
[45] Date of Patent: May 18, 1993

[54] SNAIL/SLUG ERADICATION STAKE

[76] Inventor: Eric S. Pence, 204 Hygeia Ct., Leucadia, Calif. 92024

[21] Appl. No.: 878,214

[22] Filed: May 4, 1992

[51] Int. Cl.$^5$ .............................................. A01M 25/00
[52] U.S. Cl. ........................................................ 43/131
[58] Field of Search ................ D22/119, 120; 43/121, 43/131, 120, 107, 124; 135/118, 33, 48.5, 103; 411/477, 488, 487, 489; 47/33; 52/102

[56] References Cited

U.S. PATENT DOCUMENTS

| | | | |
|---|---|---|---|
| 1,729,389 | 5/1928 | Hughett | 43/131 |
| 2,239,937 | 1/1939 | Smith | 43/131 |
| 2,547,314 | 8/1944 | Grant | 43/131 |
| 2,837,861 | 7/1957 | Graham | 43/131 |
| 2,913,204 | 11/1959 | Stewart | 411/477 |
| 3,130,425 | 4/1964 | Kelly | 411/489 |
| 3,427,743 | 2/1968 | Brunner | 43/131 |
| 3,772,820 | 11/1973 | Bond | 43/131 |
| 3,978,607 | 9/1976 | Piere | 43/131 |
| 4,319,423 | 3/1982 | Judd | 43/121 |
| 4,485,582 | 11/1983 | Morris | 43/131 |
| 4,566,219 | 1/1986 | Firth | 43/107 |
| 4,821,452 | 4/1989 | Beckley | 43/131 |

FOREIGN PATENT DOCUMENTS

| | | | |
|---|---|---|---|
| 2817238 | 10/1979 | Fed. Rep. of Germany | 47/1 N |
| 434861 | 10/1967 | Switzerland | 43/131 |
| 15258 | of 1910 | United Kingdom | 47/41 |
| 1448214 | 9/1976 | United Kingdom | 43/131 |

*Primary Examiner*—Richard K. Seidel
*Assistant Examiner*—Jeanne M. Elpel

[57] ABSTRACT

A special stake like device preferably configured in one-piece of extruded-plastic material substantially in the form of an inverted J-shape. The inverted J-shaped portion remaining above ground, thereby forming a simple manner of cantilevered-awning protective of a poisonous substance held thereunder. The function being to provide an attractive molluscicide substance under the overhanging awning formation, where an attractive cozy shade recess serves to lure the snail out of the sun. The invention being essentially based upon the notion that once the snail has partaken of the fatal bait-substance, there is actually no need of further entrapment means for effective extermination, thus a device of minimal size is attained. The device may be economically extruded with a single or double sided awning, while an alternate generic variant injection-molded umbrella like embodiment is also set forth. In the latter embodiment, the inverted J-shape is formed continuously into a circular station to simulate a mushroom appearance, operating essentially like the planar version but virtually in the round, so as to attract equally from all directions.

3 Claims, 1 Drawing Sheet

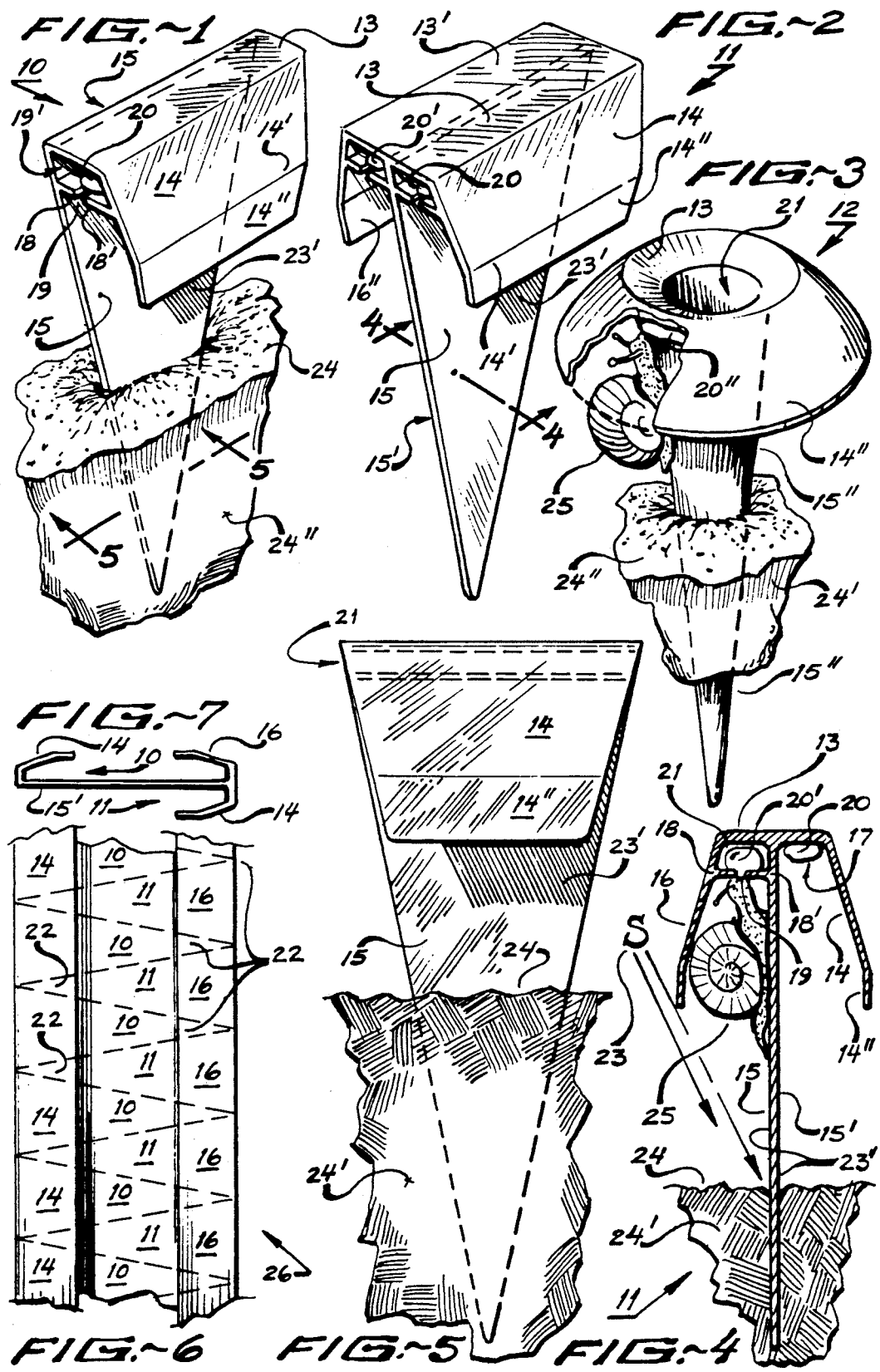

SNAIL/SLUG ERADICATION STAKE

I. PROBLEMATICAL BACKGROUND OF RELEVANT EARLIER INVENTION

This invention particularly relates to poisonous lures for eradication of the common phylum-mollusca(snail and slug) garden pests; and more specifically, the invention relates to those temporary devices which are manually positioned partially into the ground via a downward spike like member.

Heretofore, as revealed via prior art patent-search, it has generally been the practice of inventive thinking to produce poisonous-lures for snails defining a housing structure in which the snail actually enters, and within which the snail even dies, once having partaken of the fatal lure substance. A well known exception to such structural configuration has been in the form of a stake-like poisonous-lure for ant-insects, which was set forth in U.S. Pat. No. 2,547,314(filed August 1944). This shows a vertical light-weight corrugated-metal stake portion, to one side-surface of which is tab-crimped a small circular container filled with a gelatinous substance deadly to ants. The object of this construction was found in the particular undulations which provided tiny pocket areas attractive to the ants, arranged about the perimeter of the poison continer, in addition to a central entry-hole of about 5/16"-diameter. These devices are still a popular selling ant-lure, but are not known to be effective against snails in that they do not afford an attractive cool crevice in which to dwell.

The oldest known device known to employ a spike for retention into the ground is that of U.S. Pat. No. 1,729,389(filed April, 1928), comprising a poison container-cup having an underside spike, and a life-off cap thereupon; allowing filling of the poison into the cup. Still other inventions more specific to snail control are known, for example old U.S. Pat. No. 1,872,780(filed November, 1920) shows a dish-like base over which is positioned a special cover portion having several entry-way arches. Another example of a spiked type of snail lure, is found in U.S. Pat. No. 2,239,937(filed January 1939). Which is a three-piece apparatus called a "bait protector", wherein a long rod-like spike with a loop on its uppermost end, is equipped with an annular hood and is inserted down through the center of a bait-dish and down into the ground. This apparatus would thus be to bulky to use in many desired applications, where a dish and overhanging hood could not fit, such as in a flower-pot.

Later, U.S. Pat. No. 2,837,861(filed July, 1957) introduced a spiked insecticide-container having an integral annular tray and a dome-like top having many tiny holes for entry of ants. Again the annular shape would tend to be rather bulky. And U.S. Pat. No. 3,427,743(filed February, 1969) introduced another spike type insect bait-despenser with annularly-compartmented tray, but which uppermost hood member fits down to the ground, while an uppermost installation T-handle is unscrewable from the central spike so as to prevent the installed device from being readily accessed by children and pets. Again though, this configuration is to bulky for use in flower-pots for example.

Then U.S. Pat. No. 3,772,820(filed November, 1973) featured central ground-spike with an annular dome-like hood having a scalloped-rim portion positioned upon the ground, thereby enabling snails and slugs to enter the hood overlying confines. A vertically adjustable portion of the hood may be raised to allow more water to enter from some lawn-sprinkler, thereby metering water therein to activate the poison-bait. Again, the device is to bulky in diameter. U.S. Pat. No. 3,978,607(filed September, 1976) again featured a bait-dish located beneath a perimeter-scalloped hood member, with a central spike passing down unitingly through the aggregate members and into the ground; including a convenient grasping member, enabling the device to be easily withdrawn from the ground for relocation. But again, the device is too bulky for flower-pot use.

Next U.S. Pat. No. 4,485,582(filed December, 1984) shows an insect lethal-feeding station, rather mushroom like in formation; including a tubular ground-spike member for thrusting into the earth. The spike is formed integrally with an upper tray-like bait holding portion, which is topped with a transparent-cap having three perimeter entry apertures Thus, while the device could be installed in a flower-pot, it's structural provisions appear to accommodate use for bugs and ants only.

Finally, U.S. Pat. No. 4,821,452(filed December, 1987) shows a one-piece dome shaped snail-lure, the perimeter of which features three snail entry arches, the sides of which extend downward in a V-shaped manner so that the dome may be easily stabilized an inch or two into the ground by these three prongs. Once having entered the shady confines of the dome, the snail is enticed to climb the inside wall surface between the arches, so as to access the lure of a poison-bait gell-substance applied to the ceiling of the dome chamber. While, the poison is protected from sprinkling water, and not accessible to child or pet while the device is implanted, it is again to bulky to be installed into a flower-pot.

Thus, one can see from this most relevant known invention-art, that there is still room for improvement in devising a ground anchored poison-station, which can be lethal to snails, yet readily installed into a flower-pot.

II. SUMMARY OF THE INVENTION

A. In view of the foregoing discussion regarding earlier invention art, it is therefore important to make it clear to others interested in the art, that an object of this invention is to provide an inexpensive, compact one-piece plastic article, which may be readily implanted into a flower-pot, whereas other known devices for eradication of snails are generally to bulky. One of the prime advantages of this invention thus being, to require little space, thus providing a vital factor of safety; since gardners often spread poisonous snail-kibble or snail-granules about the soil instead of some safer snail-device, because of space and esthetic considerations. The invention hereof can even be injection-molded to appear substantially in the shape, color and size of a bent over leaf(forming the overhanging awning like portion) appearing to have one end down into the ground, which will visually harmonize with any garden environment.

B. Another object of this invention is to set forth a snail eradication stake which is both inexpensive to produce via plastic-extrusion process, and ecologically conservative in that the preferred embodiment is reusable simply by slidably ejecting the state poison-unit as a fresh unit is inserted.

C. Another object of this invention is to set forth a snail eradication stake device which may be constructed so as to be economically extruded in plastic and post-cut into triangular shaped segments. These flatly extruded parts would include an awning like portion, and could also optionally include "opposed" awning like portions. Moreover, the initial extruded plastic part could in one embodiment feature a single awning portion along far opposite edges of the otherwise planar main body; or, in an alternate embodiment, feature a double(opposed) type awning arrangement along the far opposite edges of the planar main body portion; or, in a third generic-variant extrusion embodiment, feature both a single awning along one extruded edge, and a double(opposed) awning arrangement along the opposite far extruded edge.

D. Another object of this invention is to set forth a snail eradication stake device which would not be suitable for extrusion molding, but rather injection-molded in matched metal dies providing a conical stake shaped artical having an annular awning like portion. Similarly to the proceedingly mentioned flat extruded configuration, this mushroom like configuration would serve to contain a posionous substance for snail access up under the awning where a surface transition is made down with the stake portion of the structure continues.

III. DESCRIPTION OF THE PREFERRED EMBODIMENT DRAWINGS

The foregoing and still other objects of this invention will become fully apparent, along with various advantages and features of novelty residing in the present embodiments, from study of the following description of the variant generic species embodiments and study of the ensuing description of these embodiments. Wherein indicia of reference are shown to match related points given in the text, as well as the claims section annexed hereto; and accordingly, a better understanding of the invention and the variant uses is intended, by reference to the drawings, which are considered as primarily exemplary and not to be therefore construed as restrictive in nature.

FIG. 1, is a pictorial perspective view looking downward at the overhanging awning and left frontal aspect thereof, including phantomed portions otherwise hidden from view;

FIG. 2, is a similar viewing aspect, exhibiting a generic variant embodiment of opposed configuration;

FIG. 3, is a downward looking pictorial view, exhibiting a generic variant embodiment of circular configuration, including a cutaway portion of the umbrella;

FIG. 4, is a longitudinal end/elevation-view according to visual projection reference-arrow 4:4 of FIG. 2, wherein is included a phantom-outline depicting a usual snail retreat position thereto;

FIG. 5, is a frontal/elevation-view according to visual projection reference-arrow 5:5 of FIG. 1;

FIG. 6, is an alternate frontal-view thereof, showing how the device is preferably obtained from a continuous section.

FIG. 7, is a longitudinal end/elevation-view rotated 90 degrees therefrom.

V. DETAILED DESCRIPTION OF THE PREFERRED EMBODIMENTS

Initial reference is given by way of FIG. 1, showing a first embodiment of the invention 10, preferably having a two-edged planar spade like vertical stake portion 15(having back side surface 15') which pointed lower terminus is easily pushed manually down into surface 24 of earthen soil 24'. This stanchion portion is preferably formed continuously up into a roof like surface region 13 which continues outward and back downward into an upper-awning like surface portion 14(having provisional crease like ridge 14', and lower-awning portion 14"); thus forming an inverted-J configuration. Note also, how a hollow retention tunnel 19' is preferably created via opposed shelf like flanges 18/18', so as to retain a preferably gel-like poison substance 20, while leaving a gap forming an access feeding slot 19 there between.

This basic construction is made in the siamesed(twin-opposed) embodiment of FIG. 2, wherein the roof portion 13' is extended in opposite directions so as to somewhat more effectively attract snails from opposite directions to climb surface 15 or 15' to reach the poisonous bait 20/20'; hence this configuration is rather T-shaped. Reference to FIG. 4 end-view shows the aggregate portions are all extruded along the same linear direction, and further demonstrates how the snail 25 is lured to readily ascend the attractively broad climbing surface 15', access feeding slot 19, and partake of the bait 20'. Here, at the right, we also see a simplified variant of the invention, whereby no bait retention-flanges are provided, whereby an inherently self-adhesive poisonous gel 20 is merely applied to the linear ceiling-crevice 17 of the overhanging roof/awning aggregation 13/14. Notice also, that the snail 25 is attracted up under the inverted-U shaped overhang by virtue of the shady region 23'(also shown in FIGS. 1,2,3,5) cast by the sun's rays 23.

This extruded embodiment of the invention is further revealed in FIGS. 6 and 7, wherein FIG. 6 is a frontal or plan-view showing how the lengthy extruded member 26 is preferably cut into individual preferably symmetrical(FIG. 5) pie-shaped segments 10 and 11 which represent the finished parts 10 and 11 exhibited in FIGS. 1 and 2 respectively. How two different parts are derived from a single extrusion-die is best revealed in FIG. 7, wherein the end-view shows a single awning version on the left, and a double-awning version on the right of the single extruded member; which are post-extrudedly cut apart as stated. Very little scrap 22 is left by this technique.

Another preferably one-piece generic-variant is exhibited in FIG. 3, which is a rather mushroom like embodiment 12 owing to its being essentially a circular version of FIG. 1 embodiment 10 (if one were able to wrap the right and left ends of stake 10 around to meet each other contiguously). This injection-molded opaque-plastic version thus includes a conical stake climbing surface 15"(with central conical molding-void entiity), and a rather umbrella-like roof 13" and awning portion 14". Here, a partial awning cutaway portion shows a snail which has climbed up under the awning to partake of the gel-like bait substance 20" contained within the circular ceiling-crevice under region 13".

It is preferred to make all versions of the invention of opaque-plastic, since any clarity would reduce the attractive shady effect of the awning, which snails naturally migrate to. The extruded feeding-tunnel 19' lends itself to containment of a gel-like bait substance, or if preferred a cartridge-like bail stick may be readily inserted, automatically ejecting any stale unit in the process.

Therefore, it is understood that the utility of the foregoing adaptations of this invention are not necessarily dependent upon any prevailing invention patent; and while the present invention has been well described hereinbefore by way of preferred embodiments, it is to be realized that various changes, alterations, rearrangements, and obvious modifications may be resorted to by those skilled in the art to which it relates, without substantially departing from the impelied spirit and scope of the instant invention. Therefore, the invention has been disclosed herein by way of example, and not as imposed limitation. Accordingly, the embodiments of the invention in which an exclusive property or proprietary privilege is claimed, are defined as follows.

What is claimed of proprietary inventive origin is:

1. A ground inserted stake device for the eradication of garden snail and slug pest comprising,
a substantially triangular planer climbing body portion having a pointed terminus for the insertion into the ground and an upper body portion opposite the pointed terminus,
an awning integrally formed to said upper body potion and extending outwardly from the upper body portion and downwardly towards the ground, said awning having a protective underside,
wherein the underside of said awning defines an inverted J-shaped void attractive to said pest and having a bait molluscicide substance therein,
said planer climbing body and said awning being integrally formed by extrusion molding.

2. The stake device of claim 1, wherein said inverted J-shaped void has flanges disposed therein, said flanges providing a bait molluscicide feeding slot, said flanges being extrusion molded integral to said planer climbing body and awning.

3. The stake device of claim 1, wherein said bait molluscicide substance sticks to the underside of said awning.

* * * * *